March 16, 1948.         N. E. WAHLBERG ET AL         2,437,844
WHEEL SUSPENSION
Filed Jan. 22, 1942         2 Sheets-Sheet 1
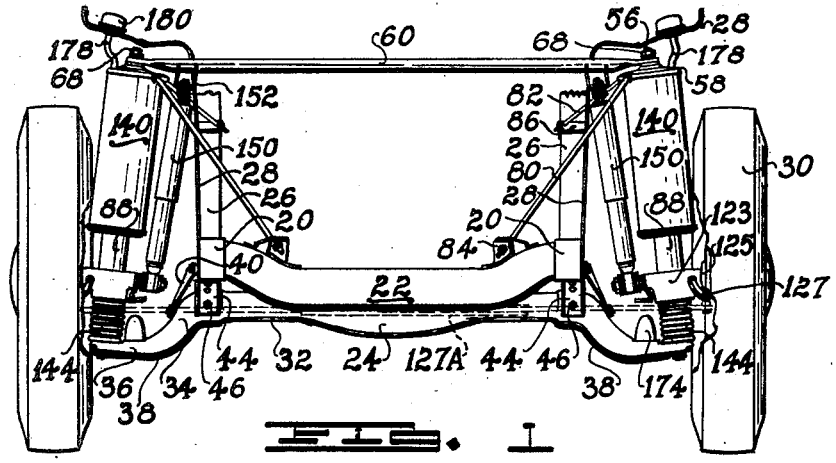
Fig. 1
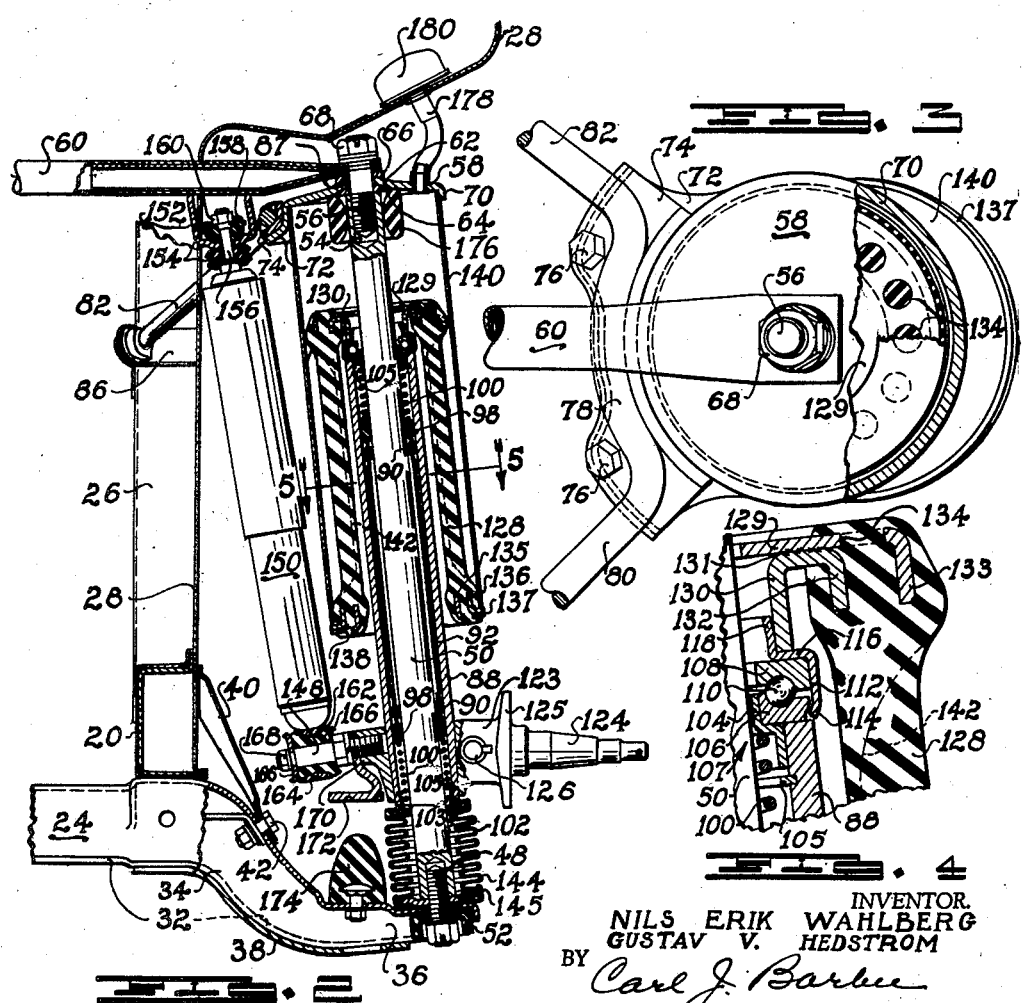
Fig. 2
Fig. 3
Fig. 4
INVENTOR.
NILS ERIK WAHLBERG
GUSTAV V. HEDSTROM
BY Carl J. Barber
THEIR ATTORNEY

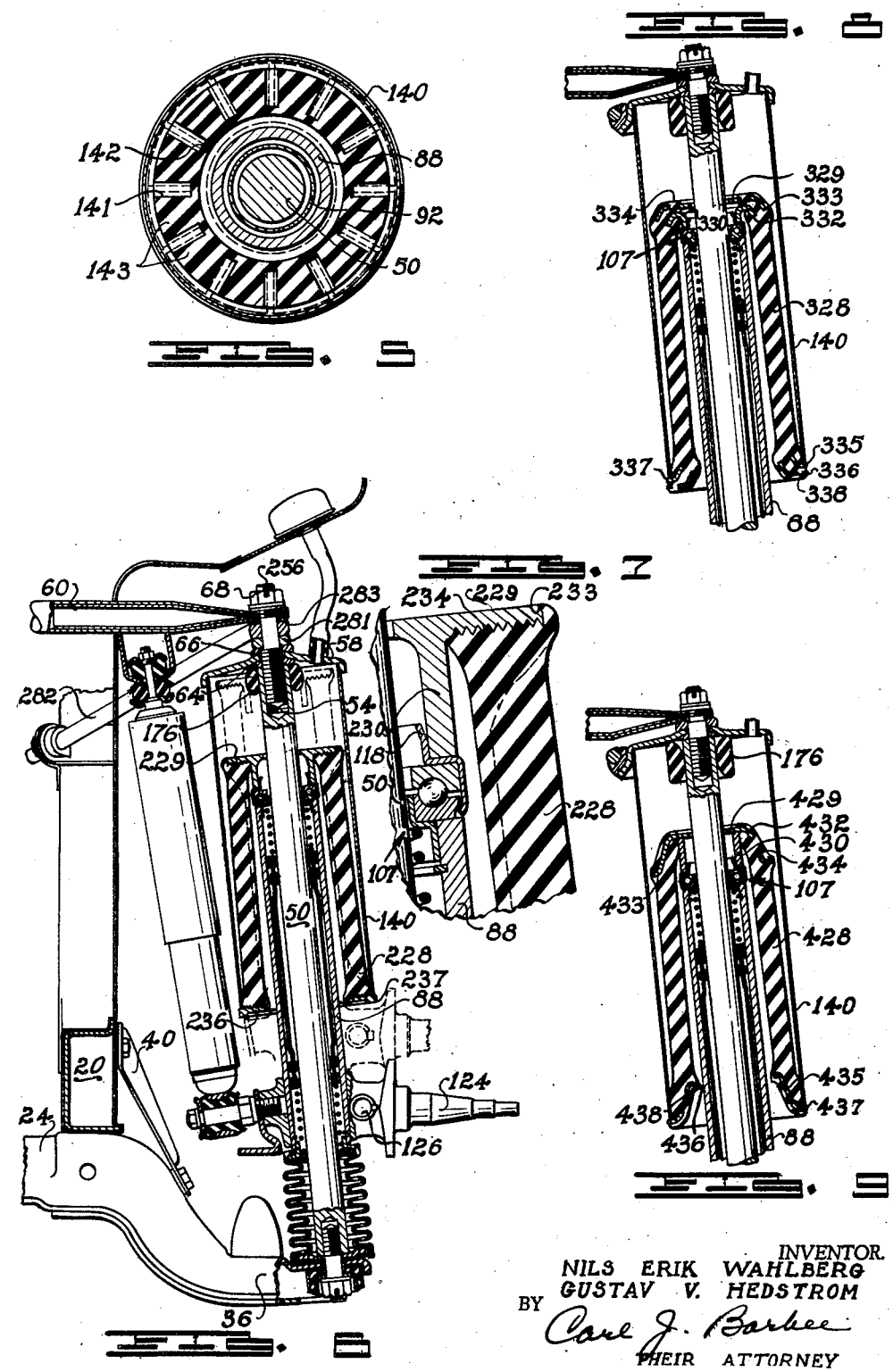

Patented Mar. 16, 1948

2,437,844

UNITED STATES PATENT OFFICE 2,437,844

WHEEL SUSPENSION

Nils Erik Wahlberg, Chicago, Ill., and Gustav V. Hedstrom, Kenosha, Wis., assignors to Nash-Kelvinator Corporation, Kenosha, Wis., a corporation of Maryland Application January 22, 1942, Serial No. 427,706

14 Claims. (Cl. 280—96.2)

This invention relates to wheel suspensions and has particular reference to means for mounting the steerable road wheels of an automobile on the frame of the automobile.

It is an object of this invention to provide a rubber tension spring for a road wheel.

It is another object of this invention to provide means for mounting a tubular rubber spring so that it will support a road wheel by tension loads in the spring.

It is another object of this invention to provide means for connecting the opposite ends of a tubular rubber spring between an automobile frame and a wheel spindle.

It is another object of this invention to provide means for guiding the free end of a tubular rubber spring relative to a king pin about which a steering knuckle attached to the spring is rotatable.

It is another object of this invention to provide a rubber tension spring for supporting a steering knuckle on a king pin, which spring will seal the bearings between the king pin and knuckle from dust and moisture.

It is another object of this invention to provide means for securely bonding the ends of a rubber spring to the metallic parts of a wheel suspension structure.

Other objects and advantages of this invention will be apparent from a consideratiion of the following description and claims and the attached drawings, of which there are two sheets, and in which—

Figure 1 represents a front elevation of an automobile frame with steerable road wheels mounted thereon;

Figure 2 represents a transverse sectional view through the wheel suspension structure illustrated in Figure 1;

Figure 3 represents a plan view of the wheel suspension structure illustrated in Figures 1 and 2;

Figure 4 represents an enlarged, detailed, sectional view showing the connection between the top of the rubber spring and the steering knuckle sleeve illustrated in Figure 2;

Figure 5 represents a sectional view taken along the plane indicated by the line 5—5 in Figure 2;

Figure 6 represents a transverse sectional view through a wheel suspension system similar to that shown in Figure 2 but employing a modified form of spring;

Figure 7 represents an enlarged, detailed, sectional view illustrating the connection between the rubber tension spring and the steering knuckle sleeve illustrated in Figure 6;

Figure 8 illustrates a transverse sectional view through a further modified form of the spring suspension; and Figure 9 represents a transverse sectional view through still another modified form of the spring suspension.

The drawings illustrate means for employing a tubular rubber spring to support the steerable road wheels of an automobile. However, it should be obvious that the same type of spring and guide mechanism could be employed for mounting the non-steerable or rear wheels of an automobile.

The suspension system is illustrated as being applied to an automobile having longitudinally extending side rail members 20 which are connected at their forward end by a cross member 22 and to which the rigid axle member 24 is attached along a line to the rear of the cross member 22. The side rails 20 are further braced with respect to the body of the automobile by the vertically sloping braces 26. Wheel house panels 28 extend upwardly from the side rails 20 along the sides of the vertical braces 26 and curve outwardly toward the wheels 30.

The rigid axle 24 consists of a downwardly opening, channel shaped member having flanges 32 turned outwardly along the lower edges thereof. The ends of the axle are bent downwardly as at 34 and outwardly toward the sides of the automobile in generally horizontal ends 36. The channel shaped cross section of the axle is closed to form a hollow box section by the reinforcing plates 38 secured to the flanges 32 along the downwardly bent portions 34 and ends 36. Brace plates 40 have their upper ends secured to the outside of the side rails 20 and their lower ends secured to the bent down portions 34 of the axle by the bolt 42 while brackets 44 are riveted to the undersides of the side rails 20 and are secured to the axle by bolts 46 provided to secure the axle to the side rails (see Figure 1).

The outer ends 36 of the axle 24 are apertured to pass the stud bolts 48 which extend upwardly into holes tapped in the ends of the generally vertically extending king pins 50. Generally cup shaped bushings 52 having rubber or other deformable material bonded therein are positioned between the bolts 48 and the end portions 36 of the axle 24 to insulate the bolts from the axle.

The upper ends of the king pins 50 are provided with axially extending tapped apertures 54 which are arranged to receive the lower ends of the stud bolts 56. The stud bolts 56 extend upwardly through the cap members 58 and through the apertured ends of a transverse brace rod 60. The cap members 58 are each provided with a central portion 62 which is downwardly concave, semi-spherical in shape. A convex, semi-spherical washer 64 is positioned around the stud bolt 56 and between the spherical portion 62 of each cap 58 and the upper end of the king pin 50. A washer 66 having a concave, semi-spherical lower surface is positioned around each bolt 56 and over the dome portions 62 of the caps 58. The ends of the cross bar 60 are drawn down tight against the washers 66 by means of nuts 68 to tightly clamp the cap members 58 and washers 64 to the top of the king pins 50.

The caps 58 are provided with cylindrical down-turned flanges 70, the inner edges of which are extended and bent inwardly toward the center of the automobile as at 72 to form ears for attaching brace plates 74 which are connected to the ears by means of the cap screws 76 (see Figure 3). Each brace plate 74 has secured thereto, as by welding, a brace rod 78 which has its central portion curved partially around the cap 58 and which is provided with a forwardly and downwardly extending arm 80 and a rearwardly and downwardly extending arm 82. The forwardly extending arms 80 of each brace rod are passed through holes in the wheel house panels 28 and are connected to brackets 84 secured to the front cross member 22 and the rearwardly extending arms 82 are also passed through the wheel house and extend to other brackets 86 secured to the vertically sloping braces 26 on the automobile body.

Thus the king pin 50 is rigidly supported in a generally vertical position, its lower end being mounted on the end of the axle 24 and its upper end being braced to the front cross member 22 and the vertical brace 26. The king pins on the opposite sides of the vehicle are further interconnected and braced with respect to each other by the tie rod 60. The caps 58 are self-aligning between the semi-spherical surfaces of the washers 64 and 66 so as to be normal to the axes of the king pins 50. Attention is called to the fact that ample clearance is provided between the caps 58 and the stud bolts 56 as at 87.

A sleeve 88 is telescopically positioned about each king pin 50 while bearings 90 carried in apertures in the ends of a bearing retainer tube 92 are positioned between the inside surface of the sleeve 88 and the surface of the king pin 50. The bearings 90 are generally cylindrical but have their central portions turned along a radius to roll along the surface of the king pin 50 and their ends tapered to roll along the inside surface of the sleeve 88 as disclosed in the co-pending application of Nils Erik Wahlberg for Wheel suspensions, Serial No. 312,656, filed January 6, 1940, and which has since issued as United States Letters Patent No. 2,304,291, dated December 8, 1942.

Washers 98 consisting of annular rings of felt secured between the annular metal rings are positioned at each end of the bearing retainer 92 to prevent dust and moisture which may enter the space between the king pin and the sleeve from coming in contact with the bearings 90. Coil springs 100 extend between the washers 98 and the ends of the sleeve 88 to hold the washers and the bearing retainer between the ends of the sleeve 88. A plate 102 is secured to the under-side of a flanged annular plug 103 driven into the lower end of the sleeve 88 and forms an abutment at the end of the sleeve against which the lower end of the lower spring 100 may abut.

The upper spring 100 is held in place by means of an annular ring 104 having a generally Z-shaped cross section, the lower flange of which is press fitted within the upper end of the sleeve 88 and the upper flange of which is spaced radially inwardly therefrom, just clearing the king pin 50. The upper end of the upper spring 100 abuts against the underside of the central web of the ring 104. Snap rings 105 are positioned in internal grooves at the ends of the sleeve 88 to retain the washers 98 and bearing retainer 92 within the sleeve should either of the springs 100 break. The upper flange and web of the annular Z-shaped ring 104 receive and center the lower race 106 of a bearing assembly generally indicated at 107 (see Fig. 4) upon the upper end of the sleeve 88. An upper race 108 completes a runway for ball bearings 110 while the two races are retained together by the cylindrical ring 112. The ring 112 has its lower edge turned inwardly as at 114 to engage the underside of the lower race 106. The upper edge of the cylindrical ring 112 is also turned inwardly as at 116 to rest upon the upper race 108 and is flanged upwardly and inwardly as at 118 for a purpose to be described presently.

A forging 123 defines a tapered aperture into which is driven the tapered lower end of the sleeve 88. The forging has a wheel spindle 124 and flange 125 formed thereon for attaching the wheel 30 and a brake backing plate to the forging and sleeve 88. The forging 123 is further apertured as at 126 (see Figure 2) to receive the steering knuckle arm 127 (see Figure 1) which is arranged to be connected to suitable steering gear and linkage, shown in dotted lines in Figure 1 at 127A, for turning the sleeve 88 and spindle 124 about the axis of the king pin 50.

It will thus be seen that the king pins 50 are rigidly carried on the frame of the automobile and that the wheels 30 are carried by the sleeves 88 which are slideable along and turnable about the king pins 50. The structure just described is similar to the structure described and claimed in the co-pending application of Nils Erik Wahlberg, Ross H. Phelps, and Wallace S. Berry for Automotive suspension, Serial No. 370,286, filed December 16, 1940, and which has since issued as United States Letters Patent No. 2,325,894, dated August 3, 1943. The means for cushioning the vertical movement of the sleeves 88 along the king pins 50 and supporting the frame on the wheels 30 will now be described. The supporting structure on each side of the automobile being the same, only one side will be described.

The specific structure of the tubular rubber spring hereinafter described has been made the subject matter of a co-pending application of Nils Erik Wahlberg and Gustav V. Hedstrom for Spring means, Serial No. 759,484, filed July 8, 1947.

The main cushioning member comprises a tubular sleeve 128 formed of rubber or some similar deformable material which will be referred to as a spring since it performs the function usually performed by a metallic coil spring in structures of this type. The spring 128 is positioned telescopically around the sleeve 88 with its upper end adjacent to the upper end of the sleeve (see Figure 4). The upper end of the spring is thickened in wall thickness and bonded, as by vulcanizing, to portions of an annular plate 129 and an annular ring 130. The ring 130 is generally channel shaped in cross section and has its intermediate web portion welded as at 131 to the underside of the plate 129. The plate 129 extends radially outwardly beyond the outer flange 132 of the ring 130 and is turned downwardly in a second cylindrical flange 133. That portion of the plate 129 between the flanges 132 and 133 defines a series of apertures 134. It will be noted that the end of the spring 128 extends over the plate 129 to within the circle of apertures 134, through the apertures, and over both sides of the flanges 132 and 133.

Tension loads on the spring 128 are transmitted to the plate 129 and ring 130 by shear stresses in the bonded connection between the rubber and the metal and by tension stresses in that portion of the rubber which extends through the apertures 134. Attention is called to the fact that the flanges 132 and 133 increase the bonded area considerably over the area of a single flat plate of equal diameter, thus reducing the shear stress on the bonded connection.

The inner flange of the ring 130 is arranged to fit around the inwardly flared flange 118 of the ring 112 and bear upon the inwardly turned portion 116 and the upper race 108 so that the upper end of the spring 128 is supported upon the upper end of the sleeve 88 and is rotatable with respect thereto by virtue of the bearing 107.

The lower end of the spring 128 is also increased in wall thickness and bonded around the concentric cylindrical rings 135 and 136. The rings 135 and 136 are spaced radially from each other and each has an outturned flange 137 on its lower end. The flanges 137 have the same outside diameter and are welded together where they overlap. The lower flange 137 which is turned outwardly from the inner ring 135 defines a series of apertures 138 opening into the space between the two rings and the enlarged lower end of the spring 128 extends over the inside of the ring 135 and bottom of the lower flange 137 and through the apertures 138.

The outer rim portions of the flanges 137 extend out of the end of the spring which is bonded to the rest of the surfaces of the flanges and rings 135 and 136. The extending rims of the flanges 137 bear against the lower end of a rigid cylinder 140 while the thickened portion of the lower end of the spring engages the inside of the lower end of the cylinder to maintain the rings 135 and 136 and cylinder 140 in concentric relationship. The upper end of the cylinder 140 extends telescopically about the spring 128 and king pin 50 to the cap 58 and is secured as by welding to the inside of the cylindrical flange 70.

The upper end of the spring 128 is thus supported through the sleeve 88, forging 123 and wheel 30 from the ground while the lower end of the spring supports the body of the automobile through the cylinder 140, cap 58 and king pin 50 by tension loads in the spring. The elastic properties of rubber under tension produce a spring which prevents the transmission of high frequency vibrations and noises from the wheels to the body of the automobile.

Attention is now called to Figure 5 which illustrates another feature of the spring 128. If a rubber cylinder is stretched from its ends, it will be reduced in cross section in the middle, both in wall thickness and in outside and inside diameter so that the spring 128 would tend to grip the outer surface of the sleeve 88 if the spring were a true cylinder. To avoid this, the outer surface of the spring between the ends thereof is slotted longitudinally as at 141 either by cutting away the rubber or by molding the slots in the spring. The slots do not extend completely through the spring but leave a relatively thin wall 142, the purpose of which will appear presently. The effect of the slots 141 is to form a series of separate rubber bands 143. When the spring is stretched, the reduction in cross section referred to above takes place within each individual band 143 and there is little tendency for the diameter of the spring as a whole to be reduced. Thus the spring will not grip the sleeve 88 and change the characteristics of the spring. The dotted lines in Figure 5 indicate the position of the spring when at rest while the full lines indicate the spring when under tension.

The inner wall 142 will be seen to form a seal from the cylinder 140 to the ring 130 at the top of the spring. The top of the cylinder 140 is closed by the cap member 58 and the ring 130 and ring 112 continue the seal around the bearing 107 to the sleeve 88 so that no dust or moisture can reach the bearing 107 or the bearings 90 through the upper end of the sleeve.

A corrugated rubber bellows 144 has its upper edge snapped around the edge of the plug 103 and the plate 102 at the lower end of the sleeve 88 while the lower end of the bellows 144 is snapped over the raised rim of an annular washer 145. The annular washer 145 is positioned between the lower end of the king pin 50 and the upper surface of the end portion 36 of the axle member 24. The washer 145 serves to seal the lower end of the bellows 144 to the cross member to prevent dust and moisture from entering through the bellows to the space between the lower ends of the king pin and the sleeve 88.

A stud bolt 148 has one end threaded into a tapped aperture in the forging 123 and serves as a connection for the lower end of a strut type shock absorber 150. The upper end of the shock absorber 150 is attached to a generally U-shaped bracket 152 depending from the cross brace 60. The connection between the upper end of the shock absorber and the bracket 152 is made flexible by the use of the rubber biscuits 154 positioned around the bayonet end 156 of the shock absorber on either side of the bracket and held in place by the metal washers 158 and nut 160. The connection between the lower end of the shock absorber and the bolt 148 is also made relatively flexible by means of the rubber sleeve 162 positioned around the bolt 148 and within an eye 164 on the bottom of the shock absorber. The ends of the sleeve 162 are compressed between the flared washers 166 by the nut 168. The flexible connections at each end of the shock absorber permit the shock absorber to swing to various positions as the forging 123 is turned about the king pin 50.

A plate 170 is secured between the forging 123 and the shock absorber 150 by the bolt 148 and is provided with a horizontal stop portion 172 arranged to abut against and to compress the rubber bumper 174 secured to the horizontal end 36 of the axle member 24 when the forging 123 and sleeve are at the lower limit of their travel along the king pin 50. The bumper 174 is known as the rebound bumper.

At the upper limit of travel along the king pin 50, the sleeve 88 is arranged to bring the upper surface of the plate 129 against the rubber ring 176 and compress it against the cap member 58 in the extreme bump position of the road wheel. The space within the cylinder 140 and spring 128 is vented to the atmosphere by a tube 178 which extends from the cap 58 through the wheel house panel 28 and is provided at its upper end with a filter cap 180.

The modified form of the invention illustrated in Figures 6 and 7 is substantially the same as that just described except in the construction at the ends of the rubber spring which will be described presently. Another variation from the preferred form of the invention is in the method of connecting the brace rods from the frame members of the body to the top of the king pin 50. Instead of being formed as a continuous bar welded to the side of the cap 58, the brace rods, one of which is shown in full at 282, are separate and are provided with eyes 281 and 283 which are positioned around the shank of a stud bolt 256. The stud bolt 256 is threaded into the tapped aperture 54 in the upper end of the king pin in the same manner as the stud bolt 56 in the first form of the invention and is passed through the end of the cross brace 60 as well as the semi-spherical washers 64 and 66 and the cap member 58. The eyes 281 and 283 of the brace rods are thus securely clamped to the king pin by the same nut 68 which secures the cross brace and cap member to the king pin.

The rubber spring 228 has its upper end secured as by bonding to the serrated under surface 234 of the annular plate 229. The upper outer edge of the plate 229 is beveled as at 233 and the end of the spring extends over the edge of the plate and the beveled surface and is bonded thereto. The serrated surface 234 is formed by cutting or otherwise forming spiral or concentric grooves in the plate 229 or by forming a series of pyramidal projections on the surface. The bonded area between the plate and the rubber is thus materially increased over the area of a smooth plate of similar dimensions and the stress on the bond is proportionately reduced. A cylindrical flange 230 extends below the inner edge of the plate 229 and engages the inwardly flared vertical flange 118 on the bearing assembly 107 which is of the same construction as that shown in the first form of the invention.

The lower end of the spring 228 is bonded to the serrated upper surface of the annular plate 236 which is serrated in the same manner as the upper plate 229. The lower plate 236 has an outer rim portion 237 which extends radially outwardly beyond the area of bond between the spring and the plate and which is arranged to engage the bottom of the cylinder 140. As in the preferred form of the invention shown in Figures 1 to 5, the outer lower edge of the spring 228 is arranged to engage the inside lower edge of the cylinder 140 and center the lower end of the spring and the plate 236 with respect to the cylinder 140.

The spring 228 is thus stretched between the upper plate 229 and upper end of the sleeve 88 and the lower plate 236 and lower end of the cylinder 140 to yieldingly support the weight of the vehicle on the wheels. The spring 228 may, of course, be grooved as shown in Figure 5.

The annular plate 229 at the top of the spring 228 is arranged to abut against the rubber ring 176 at the upper limit of movement of the spindle 124 and sleeve 88 with respect to the king pin in the same manner as the upper surface of the plate 129 in Figure 2. In other respects the operation of the structure shown in Figures 6 and 7 is the same as that shown in Figure 2.

Figures 8 and 9 illustrate further modified forms of rubber springs and may be used interchangeably in either of the wheel supporting structures just described. In Figure 8 the upper end of the spring 328 is enlarged in wall thickness and bonded around the outer edges of an annular plate 329 and a generally channel shaped ring 330. The inner flange of the channel shaped ring 330 engages the bearing 107 in the same fashion as the flanges 130 and 230 in the other forms of the invention to rotatably support the upper end of the spring on the top of the sleeve 88. The outer flange 332 of the ring 330 and the outer rim 333 of the plate 329 are bent downwardly and outwardly in spaced parallel relationship while the central portion of the plate 329 is spaced upwardly from and extends over the ring 330. The central portion of the plate 329 also defines a series of apertures 334. The enlarged end of the spring 328 extends around the outer flange 332 and bent down rim 333 and through the apertures 334. This permits the area of bond between the rubber and the metal parts to be increased by extending the bond over the surfaces which were welded together in the first form of the invention. The plate 329 and ring 330 are prevented from being separated by the rubber bonded therebetween and by their overlapping relationship. Loads transmitted from the rubber to the plate 329 and its outer rim 333 by the bond connection between the spring and plate will draw the plate toward the ring 330 and compress the rubber between the plate and ring so that there will be a clamping action as well as the bonded connection tending to hold the rubber to the ring and plate.

The lower end of the spring 328 is enlarged in wall thickness and bonded around the spaced annular rings 335 and 336. The lower ring 336 is spaced below, and extends inwardly beyond, the upper ring 335 and defines a series of apertures 338 through which the rubber material of the spring extends. Each of the rings 335 and 336 are flanged upwardly and inwardly in the center and the outer edge of the upper ring 335 extends outwardly from the rubber of the spring 328 to engage the lower edge of the cylinder 140 as at 337 in the same manner as in the other forms of the invention. The same type of clamping action as occurs at the top of the spring will also be present between the lower rings 335 and 336 to assist the bond between the rubber and the rings in holding the rings and spring together.

The spring 428 illustrated in Figure 9 has its ends secured to and bonded around the ring 432 at the top of the spring and the ring 435 at the bottom of the spring. The upper ring 432 is provided with a flat annular upper portion 429, the upper surface of which is arranged to act as a bumper in cooperation with the rubber ring 176 and the lower surface of which rests upon and may be secured to a short cylinder 430. The cylinder 430 engages the bearing 107 to support the upper end of the spring in the same manner as in the other forms of the invention. The outer part of the ring 432 slopes downwardly and outwardly, terminating in a short annular flange 433 and defines a series of apertures 434 through which the rubber of the spring extends as an integral part of the spring. The lower ring 435 slopes downwardly and outwardly from a central annular flange 436 and defines a series of apertures 438 through which the rubber of the spring extends. The rubber is also bonded around the inner flange 436 of the ring 435 but does not extend completely to the outer lower edge 437 which is arranged to engage the lower edge of the cylinder 140. The tapered shape of the rings 432 and 435 has the advantage of increasing the area of bond between the rubber and the rings within the narrow space between the sleeve 88 and the cylinder 140 and also makes the rings easier to form since they may conveniently be made as stampings.

While we have described our invention in some detail, we intend this description to be an example only and not as a limitation of our invention, to which we make the following claims.

We claim:

1. Wheel suspension structure for an automobile comprising a generally vertical king pin secured to said automobile, a sleeve positioned telescopically about said king pin and movable longitudinally and rotatably with respect thereto, wheel supporting structure carried by said sleeve, a rigid cylindrical member fixed relative to said automobile and having one end positioned about said king pin and intermediate of the ends thereof, a tubular spring formed of deformable material, rings of rigid material bonded to the ends of said spring and having rim portions extending out of said deformable material, and a bearing positioned on top of said sleeve, the rim portion of the ring at the top of said sleeve being engageable with said bearing, the rim portion of the ring at the bottom of said sleeve being engageable with the end of said rigid cylindrical member.

2. In combination with a wheel suspension system having a sleeve slideable and rotatable about an axis and a generally tubular spring of deformable material, means for attaching one end of said spring to one end of said sleeve comprising upper and lower bearing races, bearings positioned between said races, an annular ring pressed into the end of said sleeve and forming a shoulder projecting thereabove, said lower race being positioned around said shoulder and upon the end of said sleeve, a second annular ring having a portion extending around both of said races and a portion forming a second shoulder on top of said upper race, and means bonded in the end of said spring engageable with said upper shoulder.

3. In a wheel suspension system including a sleeve slideable and rotatable about an axis and a tubular spring of deformable material, means for attaching the end of said spring to the end of said sleeve comprising an annular ring of rigid material having its outer rim bonded within the end of said spring, means forming an annular shoulder on the end of said sleeve, a bearing supported upon the end of said sleeve and centered by said shoulder forming means, and means forming a second annular shoulder on top of said bearing, the inner rim of said annular ring being supported upon and centered by said last mentioned means.

4. Wheel suspension mechanism for an automobile comprising a generally vertical king pin having its lower end supported upon said automobile, a cap member secured to the top of said king pin, a brace rod having a portion intermediate of its ends secured to said cap member and having its ends secured to said automobile at spaced points, a rigid cylindrical member secured to said cap member and extending downwardly therefrom and telescopically about said king pin, a sleeve positioned telescopically about said king pin and having its upper end extending to within said cylindrical member, bearings positioned between said sleeve and said king pin to facilitate sliding and rotating motion therebetween, wheel supporting structure secured to said sleeve, a tubular spring of deformable material positioned within said cylindrical member and about the end of said sleeve, an annular ring of rigid material having its outer rim integrally bonded within the upper end of said spring and its inner rim engageable with the upper end of said sleeve, a second annular ring having its inner edge bonded within the lower end of said spring and its outer rim engageable with the lower end of said cylindrical member, a bearing interposed between the inner rim of said upper ring and the upper end of said sleeve, and a deformable bumper positioned around the upper end of said king pin and compressible between said cap member and said upper ring when said sleeve is at the upper limit of its movement relative to said king pin.

5. Wheel suspension mechanism for an automobile comprising a king pin having its lower end supported upon said automobile, a cap member positioned adjacent to the upper end of said king pin, means including semi-spherical washers for clamping said cap member to said king pin, rigid means extending from said cap member to points intermediate of the ends of said king pin and spaced radially therearound, wheel supporting structure slideably carried on said king pin, and a spring of deformable material stretchable between the upper end of said wheel supporting mechanism and the lower end of said rigid means.

6. Wheel suspension mechanism for an automobile comprising a generally vertical king pin having its lower end supported upon said automobile, a cap member secured to the top of said king pin, a rigid cylindrical member secured to said cap member and extending downwardly and telescopically about said king pin, a sleeve slideable along said king pin and having its upper end extending upwardly within said cylindrical member, wheel supporting structure secured to said sleeve, a tubular spring of deformable material positioned within said cylindrical member and about the upper end of said sleeve, an annular ring of rigid material having its outer rim integrally bonded within the upper end of said spring and its inner rim supported by the upper end of said sleeve, and a second annular ring having its inner rim bonded within the lower end of said spring and its outer rim engageable with the lower end of said cylindrical member, the deformable material at the lower end of said spring engaging with the inside of said cylindrical member to center said second ring.

7. Wheel supporting mechanism comprising a fixed member, a movable member and a tube of deformable material stretched between said fixed member and said movable member, the walls of said tube defining a series of longitudinal grooves extending partially through said tube to form a series of ribs, and another fixed member arranged to guide the movement of said movable member with respect to said first fixed member.

8. Wheel suspension structure for an automobile having a frame comprising a generally vertical king pin mounted on said frame, a sleeve positioned telescopically about said king pin and slideable therealong, wheel supporting structure carried on said sleeve, a rigid cylindrical member fixed relative to said king pin and extending telescopically about one end of said sleeve, a tubular rubber spring having its lower end engageable with said cylindrical member and its upper end engageable with the upper end of said sleeve, and a bearing interposed between the upper end of said spring and the upper end of said sleeve.

9. Wheel supporting mechanism comprising a fixed member, a movable member and a tube of deformable material stretched between said fixed member and said movable member, the walls of said tube defining a series of longitudinal grooves extending partially through said tube to form a series of ribs.

10. Wheel supporting mechanism comprising a fixed member, a movable member, a tube of deformable material stretched between said fixed member and said movable member, and ribs extending longitudinally along said tube between the ends thereof.

11. Wheel supporting mechanism comprising a fixed member, a movable member and a tubular spring under tension formed of deformable material telescopically positioned around said movable member and stretched between and rigidly secured to said fixed member and to said movable member.

12. Wheel supporting mechanism comprising a relatively rigid king pin, a sleeve positioned telescopically about said king pin, bearings positioned between said king pin and said sleeve, a wheel supporting member carried by said sleeve, flexible means sealing the lower end of said sleeve to the lower end of said king pin, a cylindrical member fixed to the top of said king pin and sealed with respect thereto, said cylindrical member extending downwardly and telescopically about the upper end of said sleeve, and a tubular spring of deformable material positioned telescopically about said sleeve and within said cylindrical member, the ends of said spring being sealed to the end of said sleeve and the end of said cylindrical member.

13. An automotive wheel suspension comprising a king pin, wheel supporting structure slideable along said king pin, an annular ring member supported on said structure and around said king pin, a rigid member fixed relative to said king pin, a second annular ring member engageable with said rigid member, and a series of deformable bands positioned symmetrically about said king pin, the ends of said bands being secured to said ring members.

14. An automotive wheel suspension comprising a king pin, wheel supporting structure slideable along said king pin, an annular ring member rotatably supported on said structure and around said king pin, a rigid member fixed relative to said king pin, a second annular ring member engageable with said rigid member, and a series of deformable bands positioned symmetrically about said king pin, the ends of said bands being bonded to said ring members.

NILS ERIK WAHLBERG.
GUSTAV V. HEDSTROM.

REFERENCES CITED

The following references are of record in the file of this patent:

UNITED STATES PATENTS

| Number | Name | Date |
|---|---|---|
| 133,010 | Bridges | Nov. 12, 1872 |
| 731,174 | Glen | June 16, 1903 |
| 859,607 | Lamure | July 9, 1907 |
| 1,082,246 | Tileston | Dec. 23, 1913 |
| 1,445,669 | Dieterich | Feb. 20, 1923 |
| 1,871,390 | Reynolds | Aug. 9, 1932 |
| 2,010,368 | Martin | Aug. 6, 1935 |

FOREIGN PATENTS

| Number | Country | Date |
|---|---|---|
| 429,596 | Great Britain | May 29, 1935 |
| 616,971 | Germany | Aug. 9, 1935 |